Figure 1:
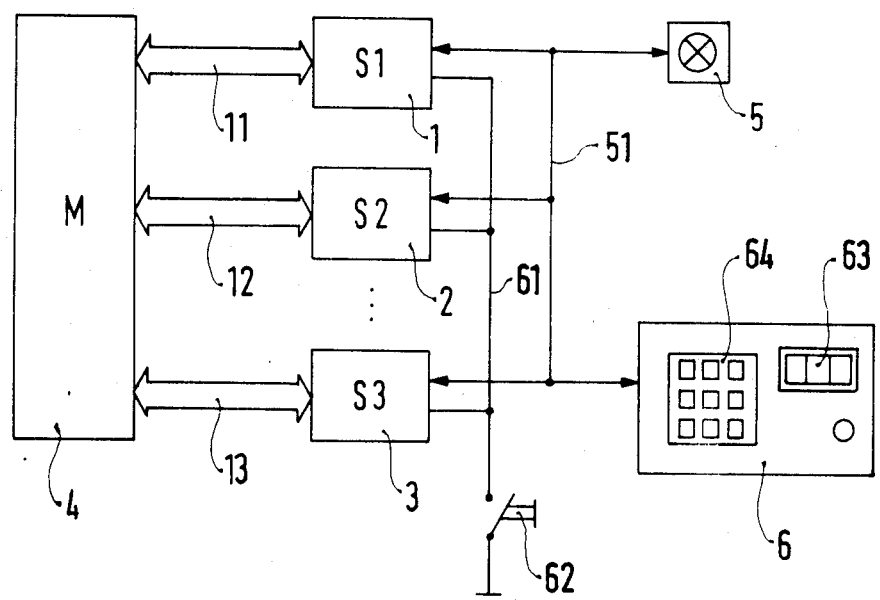

United States Patent [19]

Palesch

[11] Patent Number: 4,703,258
[45] Date of Patent: Oct. 27, 1987

[54] METHOD OF TESTING CONTROL DEVICES

[75] Inventor: Reinhard Palesch, Vaihingen/Enz, Fed. Rep. of Germany

[73] Assignee: Robert Bosch GmbH, Stuttgart, Fed. Rep. of Germany

[21] Appl. No.: 852,805

[22] PCT Filed: Aug. 8, 1985

[86] PCT No.: PCT/DE85/00267

§ 371 Date: Feb. 21, 1986

§ 102(e) Date: Feb. 21, 1986

[87] PCT Pub. No.: WO86/01620

PCT Pub. Date: Mar. 13, 1986

[30] Foreign Application Priority Data

Sep. 4, 1984 [DE] Fed. Rep. of Germany ....... 3432430

[51] Int. Cl.⁴ ............................................. G01R 31/00
[52] U.S. Cl. ................................. 324/73 R; 324/158 R
[58] Field of Search ................... 73/119 R; 324/73 R, 324/73 AT, 158 R; 340/52 F, 52 R; 364/426, 431.11; 371/68

[56] References Cited

U.S. PATENT DOCUMENTS

| | | | |
|---|---|---|---|
| 3,582,949 | 6/1971 | Forst | 340/502 |
| 3,879,704 | 4/1975 | Noji | 340/52 F |
| 3,909,842 | 6/1975 | Noji | 340/52 F |
| 3,988,730 | 10/1976 | Valker | 340/52 F |
| 4,017,841 | 4/1977 | Jensen | 340/172.5 |
| 4,153,934 | 5/1979 | Sato | 364/200 |
| 4,277,772 | 7/1981 | Kastura et al. | 340/52 F |
| 4,321,669 | 3/1982 | Macmillan | 364/200 |
| 4,356,470 | 10/1982 | Kogawa et al. | 340/52 F |
| 4,401,971 | 8/1983 | Saito et al. | 340/52 F |
| 4,426,691 | 1/1984 | Kawasaki | 340/52 F |

FOREIGN PATENT DOCUMENTS

| | | | |
|---|---|---|---|
| 0014556 | 8/1980 | European Pat. Off. | 340/52 F |
| 0072000 | 2/1983 | European Pat. Off. | |
| 2554775 | 6/1977 | Fed. Rep. of Germany | |
| 0093641 | 6/1983 | Japan | 340/52 F |
| 8200149 | 8/1983 | PCT Int'l Appl. | |

OTHER PUBLICATIONS

"Automatic Line Tester", by Canard, IBM Tech., Disc. Bull., vol. 9, #9, 2/67, p. 1099.
"Priority Arbiter", by Lee et al., IBM Tech. Disc. Bull., vol. 24, #11B, 4/82, pp. 5856-5857.

Primary Examiner—Ernest F. Karlsen
Assistant Examiner—W. Burns
Attorney, Agent, or Firm—Michael J. Striker

[57] ABSTRACT

A plurality of controller devices in a motor vehicle are tested via a single test line to indicate the occurrence of a function error which is stored in a corresponding device. To initiate the test, the test line is set to logic zero, e.g. Then all devices apply to the test line predetermined priority pulses whose lengths correspond to the order of the assigned priority and which keep the test line at zero level. After the expiration of the longest priority pulse, the test line is automatically set to logic one and the control device with the highest priority is interrogated during a predetermined time interval for the function error. Then the remaining control devices automatically apply their priority pulses to the test line, a control device with the subsequent highest priority is interrogated as to its function error, and the testing process is repeated until all devices are interrogated in the order of their priorities.

7 Claims, 3 Drawing Figures ial embodiment of the invention is illus-
METHOD OF TESTING CONTROL DEVICES

STATE OF THE ART

The invention is based on a method for testing controller devices, in particular in motor vehicles, which perform functions in dependency on sensor signals and, in the event of a function error, store an error data ward and upon interrogation convert the stored data word into an error signal or a sequence of signals.

A process and a device for selftesting of micro computer controlled switch devices, in particular in motor vehicles, is already known from PCT/DE No. 82/00 149. the switch devices perform predetermined functions in dependency on signals from a sensor and store a corresponding data word when an error is recognized. For issuing the error the data word is converted in a signal sequence or voltage and the error is determined by voltage metering. This is preferably performed in that a testing adapter is connected between the sensor lines and the switch device. A voltage meter may be connected with this testing adapter which then indicates this signal sequence or voltage. A defined type of error is assigned to a defined voltage. Thereby, with a simple commercially available voltage meter a thorough diagnosis of a complicated system may be performed. In furtherance it is known to optically indicate this signal sequence by means of blinking codes, so that a diagnosis is possible without a voltage meter.

ADVANTAGES OF THE INVENTION

The method in accordance with the invention for testing of controller devices with the characterizing features of the main claim is advantageous in that due to a single excitation of the controller devices, which are connected on the excitation line, a communication with a diagnosis tester or for the issuance of a blinking code at an error indicating device is caused by the excitation signal without a mutual interference of the controller devices.

Particular advantageous embodiments in accordance with the invention are stated in the subclaims. The calling of the next controller device can be performed by a communication from the last controller device which had performed an error issue. Thus, an automatic testing of the next controller device is provided without the intervention of a testing person. However, it is also advantageous that the testing person calls the next controller device for an error issue either on the testing device, or on the error issue device, in order to indicate that its error diagnosis for the first controller device is finished. A particularly advantageous and simple method for distributing the priorities among the controller devices consists in that each controller device applies a priority signal to the excitation line before the issue of an error, whereby duration of the priority signal is proportional to the predetermined priority of the controller device. Thus, one recognizes the controller device with the highest priority and that it was the last one which had its priority signal applied to the excitation line and now begins with the error issue. Therefore, no data transmission between the controller devices or the test device are required in this method, furthermore less additional hardware expense is needed. The excitation line is unused during the error issue, so that it can be used for the interruption of the controller device which presently performs an error issue. Thereby, it is particularly advantageous when the next controller device is made ready for an error issue by means of an excitation signal on the excitation line.

DRAWING

One exemplified embodiment of the invention is illustrated in the drawings and is explained in more detail in the subsequent description.

Figure 2:
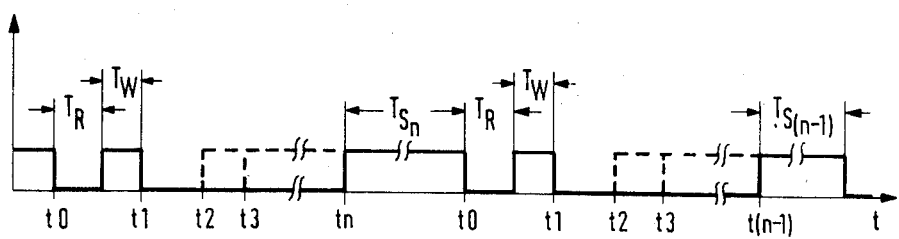
Figure 3:
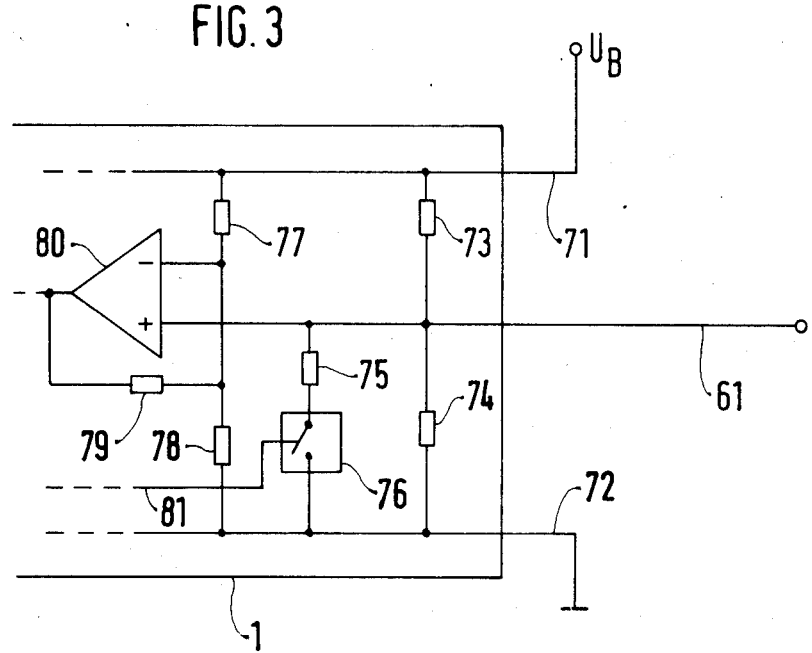

FIG. 1 illustrates a structural diagram,

FIG. 2 a signal vs. time diagram for explaining the mode of operation and;

FIG. 3 a circuit diagram for a connection of the test or excitation line to a controller device.

DESCRIPTION OF THE EXEMPLIFIED EMBODIMENT

Three controller devices S1, S2, S3 are illustrated in FIG. 1, which are connected to an internal combustion engine 4 with connecting lines 11, 12, 13. The connecting lines represent signal lines from the controller devices to the internal combustion engine as well as transmitting lines from sensors mounted on the internal combustion engine 4, to the controller devices. For example, the controller device S1 can calculate the ignition time for the internal combustion engine 4 and thereby receive a signal from a knock sound sensor. The controller device S2 may be responsible for a transmission gear control, that is, triggers a S2 shifting opertion in the drive gear, provided that a sufficient signal from the load sensor which is mounted on the internal combustion engine 4, is received. The controller S3 may be responsible for a fuel injection, that is, it calculates fuel injection times for controlling of fuel injection valves which are mounted on the internal combustion engine 4 and to receives speed signals from a tachometer which is mounted on the internal combustion engine 4. Such structures of controller devices on internal combustion engines, but also on other machines such as numerically controlled tool machines are known from the state of the art and are therefore not discussed in detail.

An error indicator lamp 5 is connected to the controller devices S1,S2,S3 by means of a transmitting line 51. The error indicator lamp 5 is used for indicating blink codes. A testing device 6 is connected to the controller devices also by means of the transmitting line 51. The testing device has at least one indicator 63 as well as an input keyboard 64. Each controller device is connected with a single test or excitation line 61 which leads to a common excitation line 61 is connected to ground.

The internal combustion engine 4 is mounted in a motor vehicle. The controller devices S1, S2, S3 which are connected to the internal combustion engine 4 have been assigned different priorities by the manufacturer of the motor vehicle, so that during a testing they are performing their error issue in the assigned sequence. Within each controller device the assigned priority manifests itself by the generation of a pulse whose duration is proportional to the priority order. These priority pulses of different duration are applied to the excitation line 61. Therefore, the controller device with the highest priority transmits the longest pulse.

A signal diagram is illustrated over a time axis t in FIG. 2. Thereby, the signal diagram represents the logical voltage levels on the excitation line 61. The error indicator lamp 5 is connected to the controller devices S1, S2, S3 to indicate an occurrence of a stored error data word. In a particular advantageous design the error indicator lamp 5 and the excitation switch 62 are together stationarily fixedly mounted on a location in the motor vehicle, whereby they can be used for a diagnosis in a motor vehicle repair shop. The person who performs the testing actuates the excitation switch 62, so that the excitation line 61 at the time point to 0 is set to logic zero for a time period $T_R$. This pulse on the excitation line 61 is recognized by the controller devices 1,2,3. After the expiration of time $T_R$ a waiting time $T_W$ occurs, after which time at the time point t1 all controller devices set the excitation line 61 to a logical zero and the assigned priority pulses of different duration corresponding to the predetermined priority are delivered by each control device to the excitation line 61. Therefore, at the time t2 the controller device with the lowest priority decouples from excitation line 61 as indicated by dashed lines in FIG. 2. Since after the decoupling the potential on the excitation line 61 remains at logic zero, despite the decoupling, the control device with the lowest priority does not perform its error issue. At the time t3 the control device with the next lowest priority decouples etc. At the time tn the longest priority pulse expires and the control device with the highest priority decouples from the excitation line. In this case, the excitation line 61 is not ordered to a logical zero neither from the excitation switch 62, nor from a controller device and therefore goes to a logical one. This positive flank is recognized by the controller device with the highest priority, whereupon during the time interval Ts, the device begins with the interrogation of its stored data word and issues an error signal through transmitting line 51 to the error indicator lamp 5.

The error indicator lamp 5 is actuated by the controller device which has the highest priority, so that the testing person can recognize the error by means of the blinking code. After the error issue the excitation line 61 is again set to zero for a time interval $T_R$, whereupon the controller device with the subsequent highest priority starts its error issue during the time interval ($T_{S(n-1)}$, after the priority had been recognized at the time point $t_{(n-1)}$.

A testing device 6 can be connected to the transmitting line 51 to enable a comfortable diagnosis. The controller devices S1, S2, S3 may be programmed through the input keyboard 64 in such a manner that at the end of an error issue the device which issued the last error issue signal automatically actuates the excitation line 61, whereupon the control device with the next lower priority automatically performs the error issue. Furthermore the course of the error issue can be interrupted through the input keyboard 64 and the next controller device can be interrogated to issue an error signal. This is also possible if the excitation switch 61 is actuated during an error indication.

A circuit diagram illustrated in FIG. 3 illustrates the connection of the excitation line 61 to the controller device 1. The connection to the other controller devices are substantially identically constructed.

The controller device 1 is connected by means of a line 71 with the supply voltage $U_B$ and by a line 72 is applied to ground. A first voltage divider, consisting of two resistors 73,74, is connected with its connecting point to the excitation line 61. A resistor 75 leads from the connecting point via an electronic switch 76 to the grounded line 72. A second voltage divider, consisting of two resistors 77,78, is connected through a resistor 79 with the output and directly with the minus input of an operation amplifier 80. A line 81 leads to the control input of the switch 76.

Thus, the controller device 1 is able to recognize the logical conditions on the excitation line 61 with the assistance of the operation amplifier 80 which is designed as a Schmitt-Trigger. By triggering the switch 76 by the priority pulse applied via line 81, the device 1 can set the potential on the excitation line 61 to a logical zero. The resistor 73 serves as a pull-up resistor and the resistor 74 is used as a line ending. Hower, it is within the framework of the invention to realize the same operational mode with different means, for example, with transistors.

An initialisation of the total testing operation, i.e., making ready the controller device with the highest priority, is performed automatically when applying the supply voltage, i.e., when actuating the ignition in the motor vehicle. However, it is also possible to program the controller device in such a manner that it starts with the error issue, when after the time $T_W$ the excitation line 61 is not connected to ground.

I claim:

1. Method of testing via a single test line a plurality of controller devices in a motor vehicle, which perform functions in dependency on sensor signals and, in the event of a function error, store an error data word and upon interrogation convert the stored data word into an error signal or a sequence of signals, comprising the steps of:

assigning to each controller device a different priority corresponding to a length of a priority pulse generated by the controller device;

applying to the test line an excitation signal which sets the test line to a logic level corresponding to the priority pulses;

simultaneously applying the priority pulses of all controller devices to the test line and, at a time point of expiration of the longest priority pulse, interrogating for a predetermined time interval the stored error data word in the corresponding controller device and transmitting the error signal to an indicator, then applying the priority pulses of the remaining controller devices to the test line and at a time point of expiration of the next longest priority pulse, repeating the application and interrogation steps for the remaining controller devices until error signals from all controller devices are transmitted to the indicator.

2. Method as defined in claim 1 wherein the excitation signal is applied via an excitation switch.

3. Method as defined in claim 1 wherein the excitation signal is applied in response to the application of the power supply to the control devices.

4. Method as defined in claim 1 wherein at the expiration time points of respective longest priority pulses applied to the test line the logic level at the test line is changed.

5. Method in accordance with claim 1 wherein the repeated application step is initiated by the controller device which performed the last error issue.

6. Method in accordance with claim 1 wherein the repeated application step is initiated by a testing device (6) which is connected with the controller devices.

7. Method in accordance with claim 1, wherein an error issue is interrupted by an excitation signal on the test line.

* * * * *